United States Patent
Franke et al.

(10) Patent No.: US 6,796,288 B2
(45) Date of Patent: Sep. 28, 2004

(54) METHOD FOR CONTROLLING INCIDENCES OF COMBUSTION IN AN UNLOADED INTERNAL COMBUSTION ENGINE

(75) Inventors: Steffen Franke, Schwieberdingen (DE); Stefan Unland, Vaihingen-Kleinglattbach (DE); Iwan Surjadi, Vaihingen (DE); Carsten Prause, Ludwigsburg-Ossweil (DE)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 10/221,282
(22) PCT Filed: Mar. 1, 2001
(86) PCT No.: PCT/DE01/00769
§ 371 (c)(1), (2), (4) Date: Dec. 23, 2002
(87) PCT Pub. No.: WO01/66923
PCT Pub. Date: Sep. 13, 2001

(65) Prior Publication Data
US 2003/0188713 A1 Oct. 9, 2003

(30) Foreign Application Priority Data
Mar. 9, 2000 (DE) .......................................... 100 11 415

(51) Int. Cl.[7] .............................................. F02D 5/15
(52) U.S. Cl. ......................... 123/406.35; 123/406.29; 123/406.24; 123/339.1
(58) Field of Search ..................... 123/406.23, 406.24, 123/339.1, 406.29, 406.35

(56) References Cited

U.S. PATENT DOCUMENTS

| | | | |
|---|---|---|---|
| 4,336,778 A | | 6/1982 | Howard |
| 4,428,343 A | * | 1/1984 | Schweikert et al. ... 123/406.52 |
| 4,552,109 A | | 11/1985 | Boccadoro et al. |
| 5,081,973 A | * | 1/1992 | Minamitani ............... 123/339.1 |
| 5,373,821 A | | 12/1994 | Nishi et al. |
| 5,445,127 A | * | 8/1995 | Cullen et al. ........... 123/406.51 |
| 5,615,655 A | * | 4/1997 | Shimizu ................. 123/406.24 |
| 5,771,862 A | * | 6/1998 | Unland et al. ......... 123/406.33 |
| 6,668,798 B2 | * | 12/2003 | Saito et al. .............. 123/406.5 |

FOREIGN PATENT DOCUMENTS

| | | |
|---|---|---|
| DE | 40 21 440 | 1/1992 |
| JP | 02 095775 | 4/1990 |
| JP | 07 224707 | 8/1995 |

* cited by examiner

Primary Examiner—Mahmoud Gimie
Assistant Examiner—Arnold Castro
(74) Attorney, Agent, or Firm—Kenyon & Kenyon

(57) ABSTRACT

A method for controlling incidences of combustion in an unloaded internal combustion engine of a vehicle. The method includes, determining a load-dynamics threshold, detecting an unloaded operating state of the internal combustion engine, detecting an incidence of the load-dynamics threshold being exceeded in the unloaded operating state, and retarding the ignition timing to form a load-dynamics aiming-off allowance that prevents combustion knock.

7 Claims, 1 Drawing Sheet

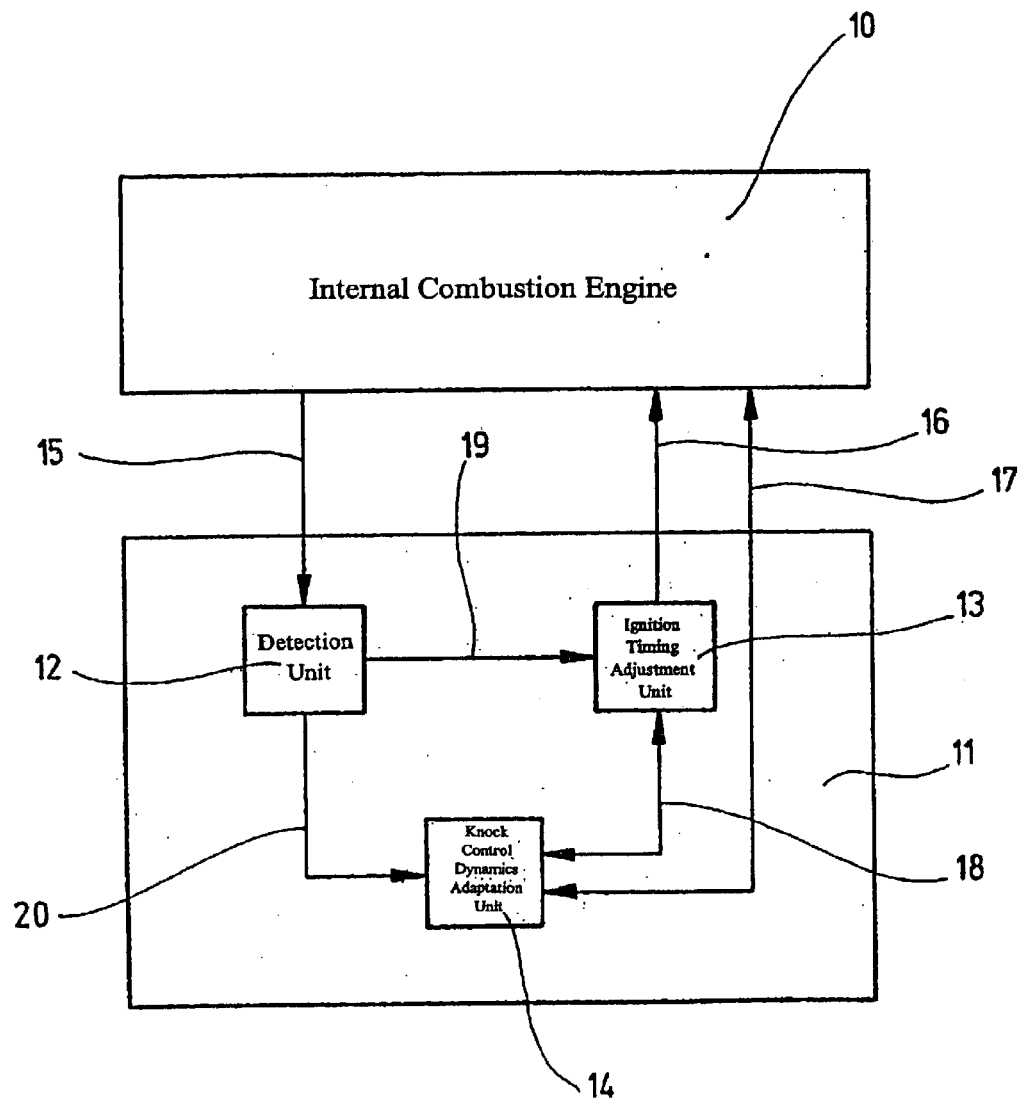

METHOD FOR CONTROLLING INCIDENCES OF COMBUSTION IN AN UNLOADED INTERNAL COMBUSTION ENGINE

FIELD OF THE INVENTION

The present invention relates to a method for controlling incidences of combustion in an unloaded internal combustion engine of a vehicle.

BACKGROUND INFORMATION

An unloaded operating state of an internal combustion engine can be present, when, at the vehicle, no gear is engaged or the clutch is opened or the vehicle speed is equal to zero. In this context, it is possible for very high load dynamics and engine-speed dynamics to set in, when the unloaded engine is revving at almost no load. Because of these increased load dynamics and engine-speed dynamics, the engine is subject to a higher tendency for combustion knock in the unloaded operating state. However, this combustion knock during an unloaded operating state of an internal combustion engine, which is also referred to as no-load revving, is particularly disadvantageous because effective and reliable knock control is made more difficult by the increased dynamics (load dynamics and engine-speed dynamics) present. In addition, combustion knock especially has a disadvantageous effect on ride comfort during an unloaded operating state, because it is easy to detect acoustically, and it is annoying in this operating state.

SUMMARY

The example method of the present invention for controlling incidences of combustion in an unloaded internal combustion engine of a vehicle is characterized by the following:

determining a load-dynamics threshold;

detecting an unloaded operating state of the internal combustion engine;

detecting the exceeding of the load-dynamics threshold in the unloaded operating state;

retarding the ignition timing to form a load-dynamics aiming-off allowance.

The occurrence of a majority of combustion-knock incidences caused by the increased load dynamics and engine-speed dynamics setting in the unloaded operating state may be prevented in a reliable and effective manner. Because of the increased tendency for combustion knock, the load-dynamics aiming-off allowance to be set in the unloaded operating state may be greater than the load dynamics and engine-speed dynamics triggered in loaded operation, i.e., when the gear is engaged and the clutch is closed. By determining a load-dynamics threshold, it is possible to reliably and precisely define an operating state having increased knock tendency. Unloaded operation of the internal combustion engine may be established as being when no gear is engaged or the clutch is opened (clutch pedal pressed down) or the vehicle speed is equal to zero. Therefore, it may be possible to quickly and reliably detect a so-called "tip-in" operating state, according to which the engine undergoes no-load or nearly no-load revving in the unloaded operating state, the probability of combustion knock occurring increasing due to the increased load dynamics and engine-speed dynamics simultaneously setting in. After detecting this operating situation, which may be critical with regard to the tendency for knock, it may be possible to prevent combustion knock in the engine or at least limit it to as few combustion incidences as possible, by producing a sufficient load-dynamics aiming-off allowance through corresponding retardation of the ignition timing.

The speed under load and the engine speed may be used as operating parameters for detecting an unloaded operating state of the engine and an engine-speed increase of the engine that is at least nearly without load. In particular, the speed under load and engine speed may present themselves as operating parameters for detecting a "tip-in" operating state, according to which no-load or nearly no-load revving of the engine occurs, possibly along with the load-dynamics threshold being exceeded, when the clutch is disengaged or a gear is not engaged or the vehicle speed is equal to zero. In this context, the speed under load and the engine speed may be ascertained in a simple and precise manner.

According to an exemplary embodiment, the ignition-timing retard value may be calculated from an ignition-retard value dependent on the engine speed. An ignition-retard value calculated as a function of the specific engine speed may be particularly suitable for ensuring a sufficient load-dynamics aiming-off allowance in a "tip-in" operating state.

According to another exemplary embodiment, the ignition-timing retard value may be calculated from the sum of an adaptive ignition-retard value and an ignition-retard value dependent on the engine speed. In this manner, the necessary load-dynamics aiming-off allowance may be calculated from an adaptive component and a component dependent on the engine speed. In this connection, the value of the adaptive load-dynamics aiming-off allowance may be known, while the value of the load-dynamics aiming-off allowance dependent on the engine speed may be determined as a function of the specific engine speed present in the unloaded operating state.

While the ignition timing is retarded, the adaptation of the knock-control dynamics may be deactivated. In particular, this allows the option of preventing the adaptation unit for the knock-control dynamics from unlearning the stored, adapted values ascertained for loaded operating states, especially due to the adjusted, engine-speed-dependent load-dynamics aiming-off allowance. This may allow the drive-away characteristics of the corresponding vehicle to be markedly improved after the unloaded operating state is brought to an end.

The ignition timing may be retarded below a predeterminable vehicle-speed threshold. In doing this, dynamic combustion knock, which may be relatively easy for a vehicle user to hear or detect, particularly at lower vehicle speeds, and therefore may have a negative effect on the ride comfort, may be prevented in the unloaded operating state of the engine.

The present invention may provide for the load-dynamics threshold being determined by a control device or stored in it; the unloaded operating state of the engine and the exceeding of the load-dynamics threshold in the unloaded operating state may be detected by a detection unit, and the ignition timing may be retarded by an ignition-timing adjustment unit to form a load-dynamics aiming-off allowance. This may allow at least a reduction in the combustion knock in a quick and reliable manner, during a "tip-in" operating state of the internal combustion engine.

Additional embodiments of the present invention may be derived from the description.

BRIEF DESCRIPTION OF THE DRAWING

The FIGURE shows a block diagram having a control device for controlling incidences of combustion in an unloaded internal combustion engine, in accordance with an example embodiment of the present invention.

DETAILED DESCRIPTION

The FIGURE shows a schematic representation of an internal combustion engine 10 of a vehicle (not shown), which is operatively connected to a control device 11. Control device 11 has a detection unit 12 for detecting a so-called "tip-in" operating state, an ignition-timing adjustment unit 13, and a unit 14 for adapting the knock-control dynamics. A "tip-in" operating state is understood as an unloaded operating state of combustion engine 10, in which the probability of disadvantageous combustion knock occurring increases due to the setting-in of increased load dynamics and engine-speed dynamics. Combustion engine 10 is connected by a data-transmission line represented by arrow 15, to detection unit 12, which, for its part, is operatively connected by control lines represented by arrows 19, 20, to ignition-timing adjustment unit 13 and the unit 14 for adapting the knock-control dynamics. Ignition-timing adjustment unit 13 is connected to the unit 14 for adapting the knock-control dynamics, using the control line represented by double arrow 18. The two units 13, 14 are also operatively connected to internal combustion engine 10 by control lines represented by arrows 16, 17.

Detection unit 12 may be used to detect an unloaded operating state of engine 10, as well as if a load-dynamics threshold is exceeded in the unloaded operating state. In this context, the engine speed of engine 10 may be used as an operating parameter. When a "tip-in" operating state has been detected by detection unit 12, it transmits an appropriate signal to ignition-timing adjustment unit 13, via the control line represented by arrow 19. A deactivation signal may be simultaneously transmitted by detection unit 12, via the control line represented by arrow 20, to the unit 14 for adapting the knock-control dynamics, in order to block the latter and thus intermittently shut it down during the detected "tip-in" operating state. Ignition-timing adjustment unit 13 may calculate an engine-speed-dependent ignition-retard value, by which a load-dynamics aiming-off allowance that prevents combustion knock may be obtained. This ignition-timing retard value may be set at internal combustion engine 10, using the control line represented by arrow 16. By this means, the load-dynamics aiming-off allowance generated by ignition-timing adjustment unit 13 may prevent combustion knock in engine 10, or may limit it to first, individual instances of combustion. The unit 14 for adapting the knock-control dynamics may be deactivated during the detected "tip-in" operating state, so that no data or signals are transmitted by the control lines represented by arrows 17, 18.

According to another exemplary embodiment, the ignition-timing retard value may be calculated by ignition-timing adjustment unit 13, from the sum of an adaptive ignition-retard value and an ignition-retard value dependent on the engine speed. In this context, the adaptive ignition-retard value may be transmitted by the unit 14 for adapting the knock-control dynamics, through the control line represented by double arrow 18, to ignition-timing adjustment unit 13. This adaptive ignition-retard value is an ignition-timing retard value stored in the unit 14 for adapting the knock-control dynamics. In this case, this stored value is not changed or adapted during the "tip-in" operating state, since, according to this alternative embodiment variant, the unit 14 for adapting the knock-control dynamics also remains deactivated during the "tip-in" operating state, so that adapted data or signals are also not transmitted to engine 10 by the control line 17 represented by an arrow.

The deactivation of knock-control-dynamics adaptation unit 14 during the "tip-in" operating state may be used to prevent the adapted values stored in unit 14 from being unlearned. After the "tip-in" operating state is ended, the unit 14 for adapting the knock-control dynamics may be restarted by detection unit 12, using the control line 20 represented by arrow 20, in order to ensure effective and optimized knock control in the subsequent load operation of engine 10. At the same time, a corresponding, normal ignition-timing adjustment may be carried out by ignition-timing adjustment unit 13.

Detection unit 12 is capable of monitoring additional operation-specific parameters, in order to initiate retardation of the ignition timing in the unloaded operating state. An example of such an additional operation-specific parameter is the vehicle speed, which may lie under a predeterminable vehicle-speed threshold, so that the retarding of the ignition timing in the unloaded operating state may be limited to a certain, lower vehicle-speed range, in which combustion knock particularly interferes with ride comfort.

A control device 11 that is formed and functions in this manner may be capable of reliably and precisely preventing disadvantageous combustion knock, or at least sharply limiting its number of incidences.

What is claimed is:

1. A method for controlling incidences of combustion in an unloaded internal combustion engine of a vehicle, comprising:

determining a load-dynamics threshold;

detecting an unloaded operating state of the internal combustion engine;

detecting an exceeding of the load-dynamics threshold in the unloaded operating state; and retarding an ignition timing to form a load-dynamics aiming-off allowance.

2. The method according to claim 1, wherein operating parameters for detecting the unloaded operating state of the engine and a speed increase of the engine that is at least nearly without load includes a speed under load and an engine speed.

3. The method according to claim 1, further comprising:

calculating an ignition-timing retard value from an ignition-retard value dependent on an engine speed.

4. The method according to claim 1, further comprising:

calculating an ignition-timing retard value from the sum of an adaptive ignition-retard value and an ignition-retard value dependent on an engine speed.

5. The method according to claim 1, further comprising:

deactivating an adaptation of a knock-control dynamics unit while the ignition timing is retarded.

6. The method according to claim 1, wherein the retarding step includes retarding the ignition timing below a predetermined vehicle-speed threshold.

7. The method according to claim 1, wherein:

the load dynamics threshold is one of i) determined by a control device, and ii) stored in the control device, the unloaded operating state of the engine and the exceeding of the load-dynamics threshold in the unloaded operating state are detected by a detection unit, and the ignition timing is retarded by an ignition-timing adjustment unit, to form the load-dynamics aiming-off allowance.

* * * * *